United States Patent
Chen et al.

(10) Patent No.: US 7,238,273 B2
(45) Date of Patent: Jul. 3, 2007

(54) PROCESS FOR UPGRADING HEAVY OIL USING A HIGHLY ACTIVE SLURRY CATALYST COMPOSITION

(75) Inventors: Kaidong Chen, Albany, CA (US); Pak C. Leung, Lafayette, CA (US); Bruce E. Reynolds, Martinez, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 540 days.

(21) Appl. No.: 10/938,269

(22) Filed: Sep. 10, 2004

(65) Prior Publication Data

US 2006/0054535 A1  Mar. 16, 2006

(51) Int. Cl.
*C10G 65/02* (2006.01)

(52) U.S. Cl. .................. 208/49; 208/108; 208/210; 208/216 R; 208/251 H; 208/254 R; 208/251 R; 208/215

(58) Field of Classification Search ............ None
See application file for complete search history.

(56) References Cited

U.S. PATENT DOCUMENTS

| 4,710,486 A | 12/1987 | Lopez et al. |
| 4,970,190 A | 11/1990 | Lopez et al. |
| 5,162,282 A | 11/1992 | Lopez et al. |
| 5,164,075 A | 11/1992 | Lopez |
| 5,178,749 A | 1/1993 | Lopez et al. |
| 5,484,755 A | 1/1996 | Lopez |

*Primary Examiner*—Tam M. Nguyen
(74) *Attorney, Agent, or Firm*—Penny L. Prater

(57) ABSTRACT

The instant invention is directed to a process for upgrading heavy oils using a slurry composition. The slurry composition is prepared by a series of steps, involving mixing a Group VIB metal oxide and aqueous ammonia to form an aqueous mixture, and sulfiding the mixture to form a slurry. The slurry is then promoted with a Group VIII metal. Subsequent steps involve mixing the slurry with a hydrocarbon oil and combining the resulting mixture with hydrogen gas and a second hydrocarbon oil having a lower viscosity than the first oil. An active catalyst composition is thereby formed.

25 Claims, 1 Drawing Sheet

PROCESS FOR UPGRADING HEAVY OIL USING A HIGHLY ACTIVE SLURRY CATALYST COMPOSITION

FIELD OF THE INVENTION

The present invention relates to a process for upgrading heavy oils using a slurry catalyst composition. These oils are characterized by low hydrogen to carbon ratios and high carbon residues, asphaltenes, nitrogen, sulfur and metal contents.

BACKGROUND OF THE INVENTION

Slurry catalyst compositions and means for their preparation and use are known in the refining arts. Some examples are discussed below.

U.S. Pat. No. 4,710,486 discloses a process for the preparation of a dispersed Group VI B metal sulfide hydrocarbon oil hydroprocessing catalyst. Process steps include reacting aqueous ammonia and a Group VI B metal compound, such as molybdenum oxide or tungsten oxide, to form a water soluble oxygen-containing compound such as ammonium molybdate or tungstate.

U.S. Pat. No. 4,970,190 discloses a process for the preparation of a dispersed Group VI B metal sulfide catalyst for use in hydrocarbon oil hydroprocessing. This catalyst is promoted with a Group VIII metal. Process steps include dissolving a Group VI B metal compound, such as molybdenum oxide or tungsten oxide, with ammonia to form a water soluble compound such as aqueous ammonium molybdate or ammonium tungstate.

U.S. Pat. Nos. 5,164,075 and 5,484,755, which are incorporated by reference, disclose processes for preparation of high activity slurry catalysts for hydroprocessing heavy hydrocarbon oils produced from Group VI B metal compounds. An aqueous mixture of the metal compound is sulfided with from greater than about 8 to about 14 standard cubic feet of hydrogen sulfide per pound of Group VI B metal. These patents demonstrate a process of forming a slurry catalyst precursor and adding it to a heavy feed oil to form the active catalyst.

U.S. Pat. Nos. 5,164,075 and 5,484,755 do not demonstrate the criticality of the oil viscosity in the formation of a highly active catalyst composition, nor the significance of using two distinctly different oils in forming such catalyst composition. In the inventions disclosed in these patents, the failure to form the oil and water emulsion or the slurry phase results in an inactive catalyst or a catalyst having low activity.

U.S. Pat. Nos. 5,162,282 and 5,178,749 are directed to processes for hydroprocessing of heavy hydrocarbonaceous oils. In U.S. Pat. No. 5,162,282, a catalyst precursor is prepared by reacting a Group VI B metal compound with a sulfiding agent in an aqueous environment substantially in the absence of oil. The precursor is heated to convert it to an active catalyst, which subsequently contacts feed at hydroprocessing conditions. In U.S. Pat. No. 5,178,749, an active catalyst slurry is prepared by sulfiding an aqueous mixture of a Group VI B metal compound with hydrogen sulfide gas. The slurry is introduced, along with the oil to be treated, into a fixed or ebullating bed of hydrodesulfurization-hydrodemetalation catalyst at hydroprocessing conditions. Although both of these patents disclose hydroprocessing with catalyst formed from precursors or slurries comprising Group VI B metal compounds, neither involves the use of two distinctly different oils in the formation of the catalyst.

This application discloses a new slurry catalyst composition that is highly active. This activity results from preparation of the catalyst using a process employing two hydrocarbon oils having appropriate viscosity ranges at 212° F.

The first heavier oil is preferably a vacuum gas oil (VGO) and the second is preferably a light naphtha.

SUMMARY OF THE INVENTION

This invention is directed to a process for upgrading heavy oils which employs contacting an oil with a highly active catalyst composition. The catalyst is prepared by the following steps:

(a) mixing a Group VI B metal oxide and aqueous ammonia to form a Group VI metal compound aqueous mixture;

(b) sulfiding, in an initial reactor, the aqueous mixture of step (a) with a gas comprising hydrogen sulfide to a dosage greater than 8 SCF of hydrogen sulfide per pound of Group VI B metal to form a slurry;

(c) promoting the slurry with a Group VIII metal compound;

(d) mixing the slurry of step (c) with a first hydrocarbon oil having a viscosity of at least 2 cSt (or 32.8 SSU) @ 212° F. to form Mixture X;

(e) combining Mixture X with hydrogen gas and a second hydrocarbon oil in a second reaction zone, the second hydrocarbon oil having a boiling point in the range from 50° F. to 300° F. and having a lower viscosity than the first hydrocarbon oil; thereby forming an active catalyst composition admixed with a liquid hydrocarbon; and (f) recovering the active catalyst composition.

This new highly active slurry catalyst composition may be stored in an active and concentrated state. The catalyst composition can be directly introduced into any of the known heavy oil or residuum upgrading processes under the existing conditions of that process. The catalyst can upgrade the very high viscosity carbonaceous and/or highly paraffinic feedstocks with or without dilution of the feedstock. Product yields are primarily in the middle distillate range.

BRIEF DESCRIPTION OF THE DRAWING

The FIGURE illustrates the steps involved in the preparation of the catalyst composition.

DETAILED DESCRIPTION OF THE INVENTION

Figure 1:
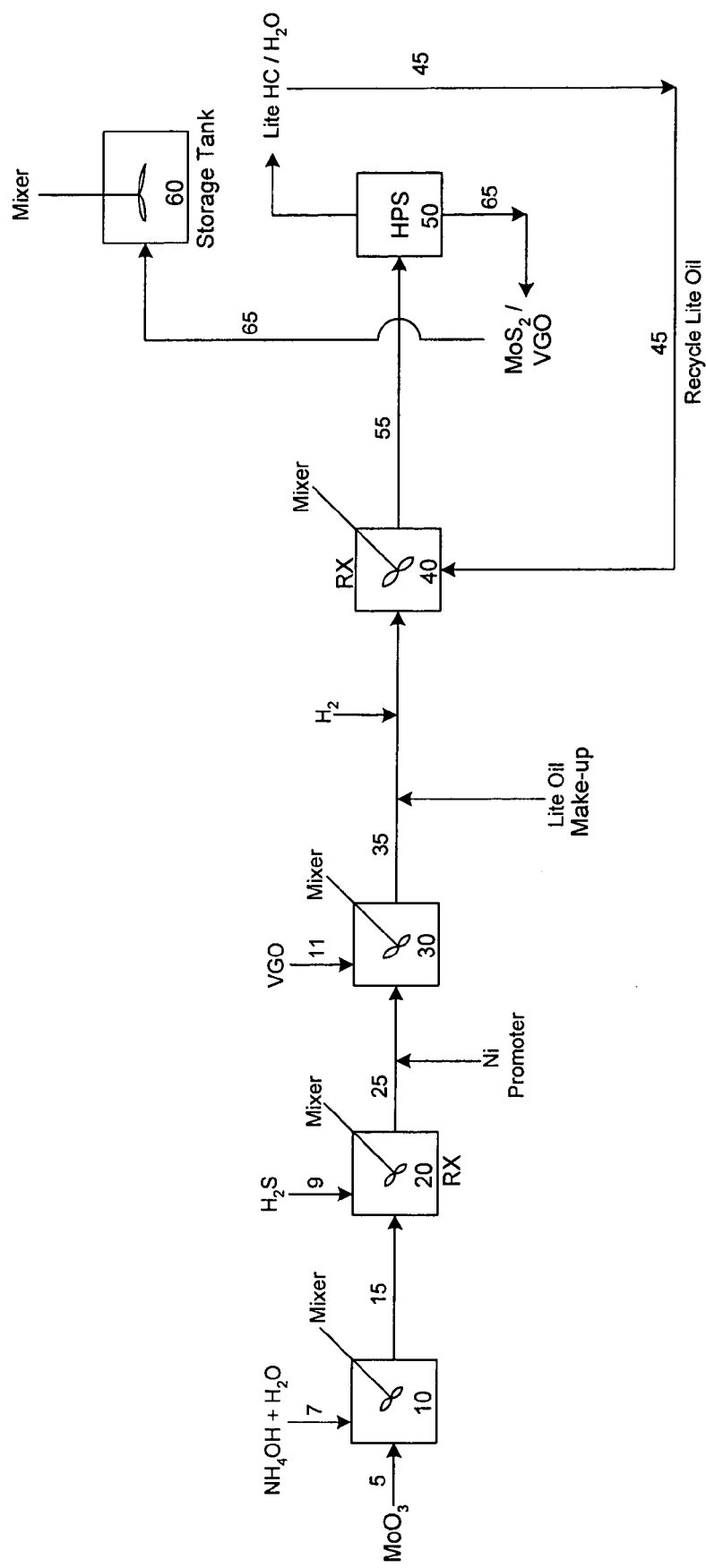

This invention relates to a process for upgrading hydrocarbons using a new highly active slurry catalyst composition. The slurry composition is formed from the addition of a first hydrocarbon oil having a viscosity of at least 2 cSt (or 32.8 SSU) @ 212° F., and a second hydrocarbon oil having a boiling point in the range from 50° F. to 300° F. to a mixture comprising a Group VI metal oxide. The preferred viscosity range for the first hydrocarbon oil is from at least about 2° cSt (or 32.8 SSU) @ 212° F. to 15 cSt (or 77.9 SSU) @ 212° F.

The FIGURE illustrates the steps involved in the preparation of the catalyst used in this invention. The active slurry catalyst composition is prepared by mixing line 5, containing an oxide of Group VI B metal such as tungsten or molybdenum, and line 7, containing aqueous ammonia, in a mixing zone 10. The temperature of the mixing zone is generally in the range from about 80° F. to about 200° F., preferably from about 100° F. to about 150° F., and most preferably from about 110° F. to about 120° F. The pressure of the mixing zone 10 is generally from about atmospheric pressure to about 100 psig, preferably from about 5 psig to about 35 psig, and most preferably from about 10 psig to about 20 psig. The Group VI B metal oxide is dissolved in water containing the ammonia. The amount of ammonia added is based on the ratio of $NH_3$ to Group VI B oxide in lbs/lbs and generally ranges from 0.1 lbs/lbs to about 1.0 lbs/lbs, preferably from about 0.15 lbs/lbs to about 0.50 lbs/lbs, and most preferably from about 0.2 lbs/lbs to about 0.30 lbs/lbs. The dissolved metal oxide in aqueous ammonia is moved via line 15 to the first reaction zone.

The amount of hydrogen sulfide (line 9) added to the reaction zone 20 is based on the ratio of $H_2S$ to Group VI B metal oxide in SCF/lbs and generally ranges from 4.0 SCF/lbs to about 20 SCF/lbs, preferably from about 8.0 SCF/lbs to about 15 SCF/lbs, and most preferably from about 12 to 14 SCF/lbs. The reaction time in the first reaction zone ranges from about 1 hour to 10 hours, preferably from 3 hours to 8 hours, and most preferably from about 4 hours to 6 hours. Conditions include a temperature in the range from 80° F. to 200° F., preferably in the range from 100° F. to 180° F., and most preferably in the range from 130° F. to 160° F. Pressure is in the range from 100 to 3000 psig, preferably in the range from 200 to 1000 psig, and most preferably from 300 to 500 psig. The resultant aqueous slurry is the catalyst precursor in an aqueous slurry phase.

The resultant slurry is combined with a Group VIII metal compound such as Ni or Co, as disclosed in U.S. Pat. No. 5,484,755. As an enhancement of the denitrogenation activity of the active slurry catalyst of the present invention, it is preferred that a Group VIII metal compound be added to the slurry before mixing the slurry with feed oil and a hydrogen containing gas at elevated temperature and pressure. Such Group VIII metals are exemplified by nickel and cobalt. It is preferred that the weight ratio of nickel or cobalt to molybdenum range from about 1:100 to about 1:2. It is most preferred that the weight ratio of nickel to molybdenum range from about 1:25 to 1:10, i.e., promoter/molybdenum of 4-10 weight percent. The Group VIII metal, exemplified by nickel, is normally added in the form of the sulfate, and preferably added to the slurry after sulfiding at a pH of about 10 or below and preferably at a pH of about 8 or below. Group VIII metal nitrates, carbonates or other compounds may also be used. In view of the high activity of the slurry catalyst of the present invention, the further promotion by Group VIII metal compounds is very advantageous.

The slurry containing the Group VIII metal promoter is moved, via line 25, to mixing zone 30. Mixing zone 30 employs an inert atmosphere which can comprise nitrogen, refinery gas, or any other gas having little or no oxygen. The slurry and a first hydrocarbon oil (line 11), such as VGO, are mixed continuously in a high shear mode to maintain a homogeneous slurry in mixer 30. High shear mixing encompasses a range from 100 to 1600 RPM. Preferably the mixing rate is greater than 500 RPM and most preferably greater than 1500 RPM.

The first hydrocarbon oil has a kinetic viscosity of at least 2 cSt (32.8 SSU) @ 212° F. The kinetic viscosity can generally range from about 2 cSt (32.8 SSU) @ 212° F. to about 15 cSt (77.9 SSU) @ 212° F., preferably from about 4 cSt (39.5 SSU) @ 212° F. to about 10 cSt (59.2 SSU) @ 212° F., and most preferably from about 5 cSt (42.7 SSU) @ 212° F. to about 8 cSt (52.4 SSU) @ 212° F. The first hydrocarbon oil causes the initial transformation of the catalyst precursor to an oil base from a water base. The ratio of Group VI B metal oxide to oil is at least less than 1.0, preferably less than 0.5, and more preferably less than 0.1. If the kinetic viscosity of the oil is below about 2 cSt (32.8 SSU) @ 212° F. or above about 15 cSt (77.9 SSU) @ 212° F., the first transformation of the catalyst precursor will result in catalyst particles agglomerating or otherwise not mixing.

The material from mixing zone 30 moves to reaction zone 40 via line 35. Prior to entering reaction zone 40, the material may be combined with makeup oil of the viscosity range of the first hydrocarbon oil. Hydrogen is also added to the mixture before it enters reaction zone 40.

In reaction zone 40, a second, lighter hydrocarbon oil is added to the material from mixing zone 30. The second oil, preferably a light naphtha, preferably possess a kinetic viscosity of less than 0.3 cSt at 212° F. One source of this second oil may be recycle material from the high pressure separator 50 (line 45). High shear mixing is also employed in the reaction zone 40 in order to maintain a homogenous slurry.

The second hydrocarbon oil has a boiling point generally in the range from about 50° F. to about 300° F., preferably from about 75° F. to about 250° F., and most preferably from about 100° F. to about 150° F. The ratio of the volume of the second oil to the first oil is greater than 1, preferably greater than 5, and most preferably greater than 10. The temperature of the reaction zone 40 generally ranges from about 300° F. to 700° F., preferably from about 350° F. to about 600° F., and most preferably from about 350° F. to about 500° F. The pressure of the reaction zone 40 generally ranges from about 1000 psig to about 3500 psig, preferably from about 1500 psig to about 3000 psig, and most preferably from about 2000 psig to about 3000 psig. The hydrogen flow to the reaction zone 40 generally ranges from about 500 SCFB to about 10,000 SCFB, preferably from about 1000 SCFB to about 8000 SCFB, and most preferably from about 3000 SCFB to about 6000 SCFB. The reaction time in the reaction zone 40 ranges from about 11 minutes to 5 hours, preferably from 30 minutes to 3 hours, and most preferably from about 1 hour to 1.5 hours. The resultant slurry mixture is the active catalyst composition in a mixture of the first hydrocarbon oil and the second hydrocarbon oil. The slurry mixture is passed, through line 55, to high pressure separator 50. The high pressure separator operates in a range from 300° F. to 700° F. The second hydrocarbon oil is removed overhead through line 45 and passed to three phase separator (not shown). Gases such as hydrogen and hydrogen sulfide are removed, along with water. Light oil is recirculated back to the third reaction zone 40 by means of line 45. The active catalyst composition is moved through line 65 to storage tank 60. The active catalyst composition is continuously mixed in storage tank 60 to maintain a homogenous slurry in a hydrogen atmosphere with little or no oxygen. In this way, the catalyst activity and stability are maintained.

The catalyst composition is useful for upgrading carbonaceous feedstocks which include atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulphurization, hydrodenitrification, and hydrodemetalization. The catalyst may be used in processes employing both fixed and ebullated beds.

The process of the present invention can be operated in either one or two stage modes. In one-stage operation, the heavy oil is contacted with the active catalyst slurry and a hydrogen-containing gas at elevated temperatures and pressures in continuously stirred tank reactors or ebullated bed catalytic reactors with sufficient residence time in the catalytic reactors and at temperatures sufficient to achieve measurable thermal cracking rates. The process may be operated in a two-stage mode where the first-stage comprises the contacting of the active catalyst slurry with the heavy oil and a hydrogen-containing gas with sufficient time and temperature in continuously stirred tank reactors or ebullated bed catalytic reactors, to achieve reasonable thermal cracking rates. The resultant light oil is separated from solid catalyst and unconverted heavy oil in a high pressure separator, and then the light oil is sent to the second-stage reactor which typically is a fixed bed reactor used for hydrotreating of oil to further remove sulfur and nitrogen, and to improve product qualities.

For the first-stage operation, the temperatures for heavy oil feedstocks are normally above about 700° F., preferably above 750° F., and most preferably above 800° F. in order to achieve high conversion. The concentration of the active slurry catalyst in the heavy oil is normally from about 100 to 20,000 ppm expressed as weight of metal (molybdenum) to weight of heavy oil feedstock. Typically, higher catalyst to oil ratio will give higher conversion for sulfur, nitrogen and metal removal, as well as the higher cracking conversion. Near 100% demetalation conversion and 1000° F.+cracking conversion of the heavy oil can be achieved at appropriate process conditions, while the coke yield can be maintained at less than about 1%.

The process conditions for the second-stage or fixed bed reactor are typical of heavy oil hydrotreating conditions. The second-stage reactor may be either a fixed, ebullated or a moving bed reactor. The catalyst used in the second-stage reactor is a hydrotreating catalyst such as those containing a Group VI B and/or a Group VIII metal deposited on a refractory metal oxide. By using this integrated hydrotreating process, the sulfur and nitrogen content in the product oil can be very low, and the product oil qualities are also improved.

EXAMPLES

Example 1

For Catalyst Preparation Employing Two Oils of Different Viscosities 540 gram $MoO_3$ is mixed with 79 grams of $NH_3$ and 2381 grams of $H_2O$ to form a solution of total 3000 grams. The solution is then reacted with 10.71 SCF of $H_2S$ by passing a gas mixture of 20% $H_2S$ in $H_2$ into the solution under strong mixing. The reactor temperature is 150° F. and the total pressure is 400 psig, and the reaction time is 4 hours. After reaction, 460 grams $NiSO_4$ solution which contains 36 grams of Ni is added to the above obtained slurry. The obtained slurry mixture is then mixed with 3500 grams of vacuum gas oil at 100° F. The viscosity of the VGO is 5 cSt @ 212° F. The resulting mixture is then pumped into a continuous flow stirred tanked reactor (perfectly mixed flow reactor) and mixed with heptane and $H_2$, the ratio of heptane/VGO is 9:1 and $H_2$ gas rate is 5000 SCF/B. The reactor pressure is 2500 psig and reactor temperature is 400° F., the total reaction time is 1 hour. The reaction products go to a hot high pressure separator with temperature 500° F. (HPS is also at 2500 psig) to separate gas and liquid slurry. The obtained liquid slurry contains the highly active catalyst component.

Example 2

For Heavy Oil Upgrading (Athabasca Vacuum Residuum in Once-Through Mode)—Catalyst is Activated by Using Method Employing Two Oils of Different Viscosities The obtained catalyst was used for Athabasca VR and VGO feed upgrading in a process unit which contains two continuously stirred tank reactors. A feed blend with 60% Athabasca VR and 40% Athabasca VGO was used.

The Athabasca VR feed properties are listed in the following table:

| | |
|---|---:|
| API gravity at 60/60 | 3.9 |
| Sulfur (wt %) | 5.58 |
| Nitrogen (ppm) | 5770 |
| Nickel (ppm) | 93 |
| Vanadium (ppm) | 243 |
| Carbon (wt %) | 83.57 |
| Hydrogen (wt %) | 10.04 |
| MCRT (wt %) | 17.2 |
| Viscosity @ 212° F. (cSt) | 3727 |
| Pentane Asphaltenes (wt %) | 13.9 |
| Fraction Boiling above 1050° F. (wt %) | 81 |

The Athabasca VGO feed properties are listed in the following table:

| | |
|---|---:|
| API gravity at 60/60 | 15.6 |
| Sulfur (wt %) | 3.28 |
| Nitrogen (ppm) | 1177 |
| Carbon (wt %) | 85.29 |
| Hydrogen (wt %) | 11.01 |
| MCRT (wt %) | 0.04 |
| Fraction Boiling above 650° F. (wt %) | 85 |

The process conditions used for the heavy oil upgrading are listed as following:

| | |
|---|---:|
| Total pressure (psig) | 2500 |
| Mo/Oil ratio (%) | 1.5 |
| LHSV | 0.25 |
| Reactor temperature (°F.) | 810 |
| H2 gas rate (SCF/B) | 7500 |

The product yields, properties and conversion are listed in the following table:

| | |
|---|---:|
| C4- gas (wt %) | 4.6 |
| CS-180° F. (wt %) | 5.1 |
| 180–350° F. (wt %) | 14.5 |
| 350–500° F. (wt %) | 20.5 |
| 500–650° F. (wt %) | 26.5 |
| 650–800° F. (wt %) | 18.9 |
| 800–1000° F. (wt %) | 7.4 |
| 1000° F.+ (wt %) | 0.6 |
| HDN conversion (%) | 98 |
| HDS conversion (%) | 99 |

| | |
|---|---|
| HDM conversion (%) | >99 |
| Liquid product API gravity | 35.3 |

Middle distillates compose 61.5% of the product, and heteroatom content is drastically reduced.

Example 3

For Heavy Oil Upgrading (Hamaca VR in Once-Through Mode) (Catalyst is Activated by Using Method Employing Two Oils of Different Viscosities)

The obtained catalyst was used for Hamaca VR and VGO feed upgrading in a process unit which contains two continuously stirred tank reactors. A feed blend with 60% Hamaca VR and 40% Hamaca VGO was used.

The Hamaca VR feed properties are listed in the following table:

| | |
|---|---|
| API gravity at 60/60 | 1.7 |
| Sulfur (wt %) | 4.56 |
| Nitrogen (ppm) | 9222 |
| Nickel (ppm) | 168 |
| Vanadium (ppm) | 714 |
| Carbon (wt %) | 83.85 |
| Hydrogen (wt %) | 9.46 |
| Viscosity @ 266° F. (cSt) | 19882 |
| Pentane Asphaltenes (wt %) | 32 |
| Fraction Boiling above 1050° F. (wt %) | 91 |

The Hamaca VGO feed properties are listed in the following table:

| | |
|---|---|
| API gravity at 60/60 | 14.2 |
| Sulfur (wt %) | 3.53 |
| Nitrogen (ppm) | 2296 |
| Carbon (wt %) | 84.69 |
| Hydrogen (wt %) | 11.58 |
| Fraction Boiling above 650° F. (wt %) | 89 |

The process conditions used for the heavy oil upgrading is listed as following:

| | |
|---|---|
| Total pressure (psig) | 2600 |
| Mo/Oil ratio (%) | 1.5 |
| LHSV | 0.18 |
| Reactor temperature (°F.) | 800 |
| H2 gas rate (SCF/B) | 7500 |

The product yields, properties and conversion are listed in the following table:

| | |
|---|---|
| C4- gas (wt %) | 7.8 |
| C5-180°F (wt %) | 6.4 |
| 180–350° F. (wt %) | 19.2 |
| 350–500° F. (wt %) | 16.8 |
| 500–650° F. (wt %) | 21.5 |
| 650–800° F. (wt %) | 17.4 |
| 800–1000° F. (wt %) | 8 |
| 1000° F.+ (wt %) | 1.1 |
| HDN conversion (%) | 68 |
| HDS conversion (%) | 96 |
| HDM conversion (%) | >99 |
| Liquid product API gravity | 34 |

Middle distillates compose 57.5 wt % of the product. Heteroatom content is substantially reduced, but the feed is of higher nitrogen content than in Example 2.

What is claimed is:

1. A process for the hydroconversion of heavy oils, which employs a catalyst which is prepared by the following steps:
    (a) mixing a Group VI B metal oxide and aqueous ammonia to form a Group VI metal compound aqueous mixture;
    (b) sulfiding, in an initial reactor, the aqueous mixture of step (a) with a gas comprising hydrogen sulfide to a dosage greater than 8 SCF of hydrogen sulfide per pound of Group VI B metal to form a slurry;
    (c) promoting the slurry with a Group VIII metal;
    (d) mixing the slurry of step (c) with a first hydrocarbon oil having a viscosity of at least 2 cSt @ 212° F. to form Mixture X;
    (e) combining Mixture X with hydrogen gas and a second hydrocarbon oil in a second reaction zone, the second hydrocarbon oil having a boiling point in the range from 50° F. to 300° F. and having a lower viscosity than the first hydrocarbon oil, thereby forming an active catalyst composition admixed with a light hydrocarbon; and
    (f) recovering the active catalyst composition by separation from the second hydrocarbon oil,
wherein said catalyst, a hydrogen-containing gas and the heavy oil to be converted are added, at elevated temperature and pressure, to a fixed or ebullating bed.

2. The process of claim 1, wherein conditions in the first reaction zone for catalyst preparation comprise a temperature in the range from at least about 80° F. to about 200° F., and a pressure in the range from at least about 100 psig to about 3000 psig.

3. The process of claim 2, wherein conditions in the first reaction zone for catalyst preparation comprise a temperature in the range from at least about 100° F. to about 180° F., and a pressure in the range from at least about 200 psig to about 1000 psig.

4. The process of claim 3, wherein conditions in the first reaction zone for catalyst preparation comprise a temperature in the range from at least about 130° F. to about 160° F. and a pressure in the range from at least about 300 psig to about 500 psig.

5. The process of claim 1, wherein the first hydrocarbon oil viscosity ranges from at least about 2 cSt @ 212° F. to about 15 cSt @ 212° F.

6. The process of claim 1, wherein the Group VIII metal compound of step (c) is selected from the group consisting of nickel sulfates and cobalt sulfates.

7. The process of claim 1, wherein mixing of components occurs in high shear mode, in the range from 100 RPM to 1600 RPM.

8. The process of claim 6, in which the weight ratio of nickel or cobalt to molybdenum ranges from 1:100 to about 1:2.

9. The process of claim 1, wherein the second hydrocarbon oil boils in the range from at least about 50° F. to about 300° F.

10. The process of claim 9, wherein the second hydrocarbon oil boils in the range from at least about 75° F. to about 250° F.

11. The process of claim 1, wherein the ratio of the volume of the second oil to the first oil is greater than 1, preferably greater than 5, and most preferably greater than 10.

12. The process of claim 1, wherein the ratio of Group VI B metal oxide to oil is at least less than 1.0, preferably less than 0.5, and more preferably less than 0.1.

13. The process of claim 1, wherein the first hydrocarbon oil is a vacuum gas oil.

14. The process of claim 1, wherein the second hydrocarbon oil possess a kinetic viscosity of less than 0.3 cSt at 212° F.

15. The process of claim 1, wherein the second hydrocarbon oil is a light naphtha.

16. The process of claim 15, wherein the conditions of the second reaction zone for catalyst preparation comprise a temperature in the range from at least about 350° F. to about 600° F. and a pressure in the range from at least about 1000 psig to about 3500 psig.

17. The process of claim 16, wherein the conditions of the second reaction zone for catalyst preparation comprise a temperature in the range from at least about 350° F. to about 600° F. and the pressure in the range from at least about 1500 psig to about 3000 psig.

18. The process of claim 1, wherein the liquid hydrocarbon comprises a mixture of the first hydrocarbon oil and the second hydrocarbon oil.

19. The process of claim 1, wherein the catalyst is recovered by means of a high pressure separator.

20. The process of claim 1, wherein the catalyst is stored in an active and concentrated state.

21. The process of claim 1, wherein conversion in the continuously stirred tank reactors or ebullating bed reactors occurs at temperatures greater than 700° F.

22. The process of claim 1, wherein the effluent is comprised of at least 50 wt % of products boiling in the range between 180° F. and 650° F.

23. The process of claim 1, wherein the elevated temperature is at least about the incipient cracking temperature of said heavy oil.

24. The process of claim 1, wherein the heavy oil is selected from the group consisting of atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers.

25. The hydroconversion process of claim 1, which is selected from the group consisting of hydrocracking, hydrotreating, hydrodesulphurization, hydrodenitrification, and hydrodemetalization.

* * * * *